Patented Sept. 11, 1951

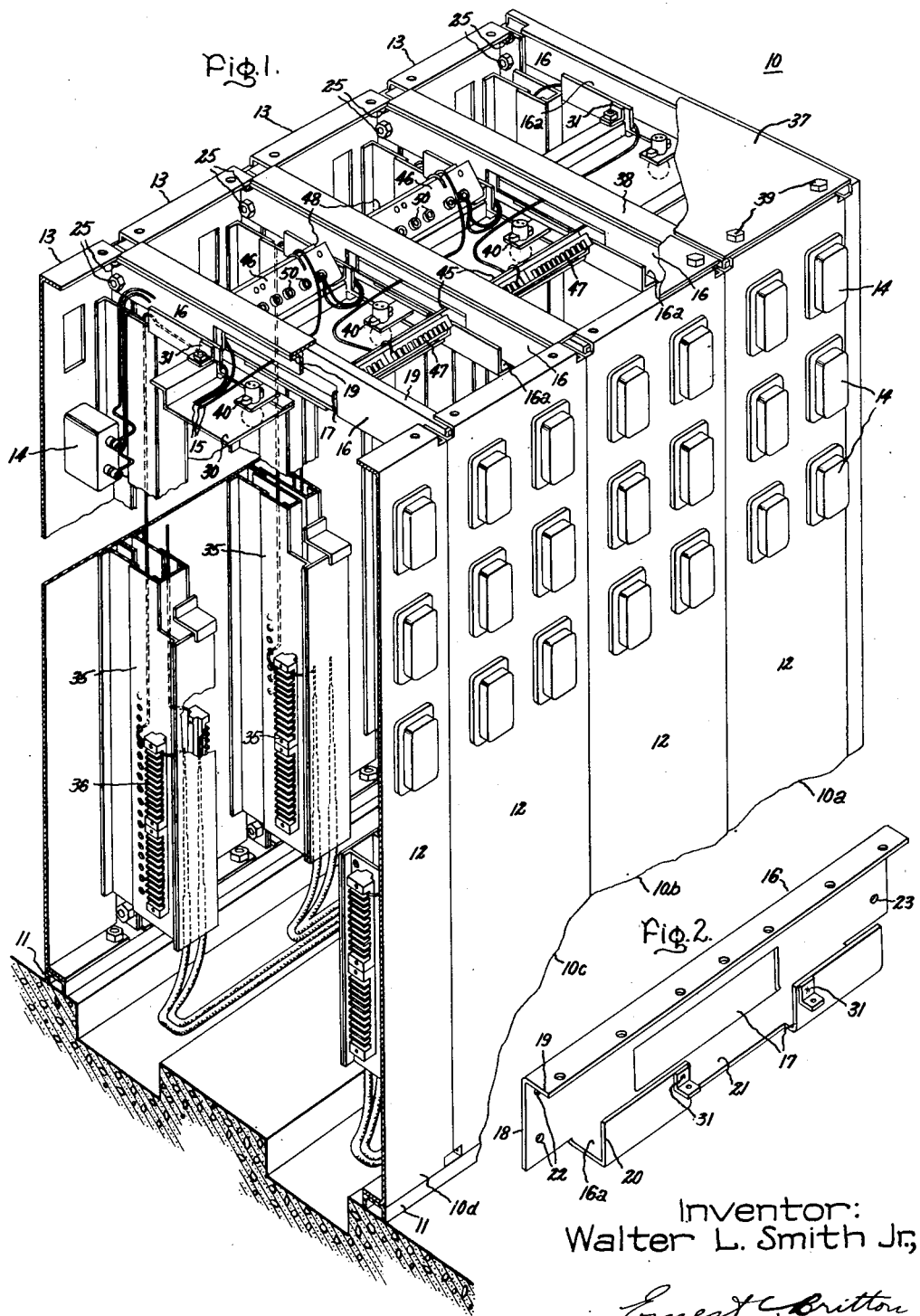

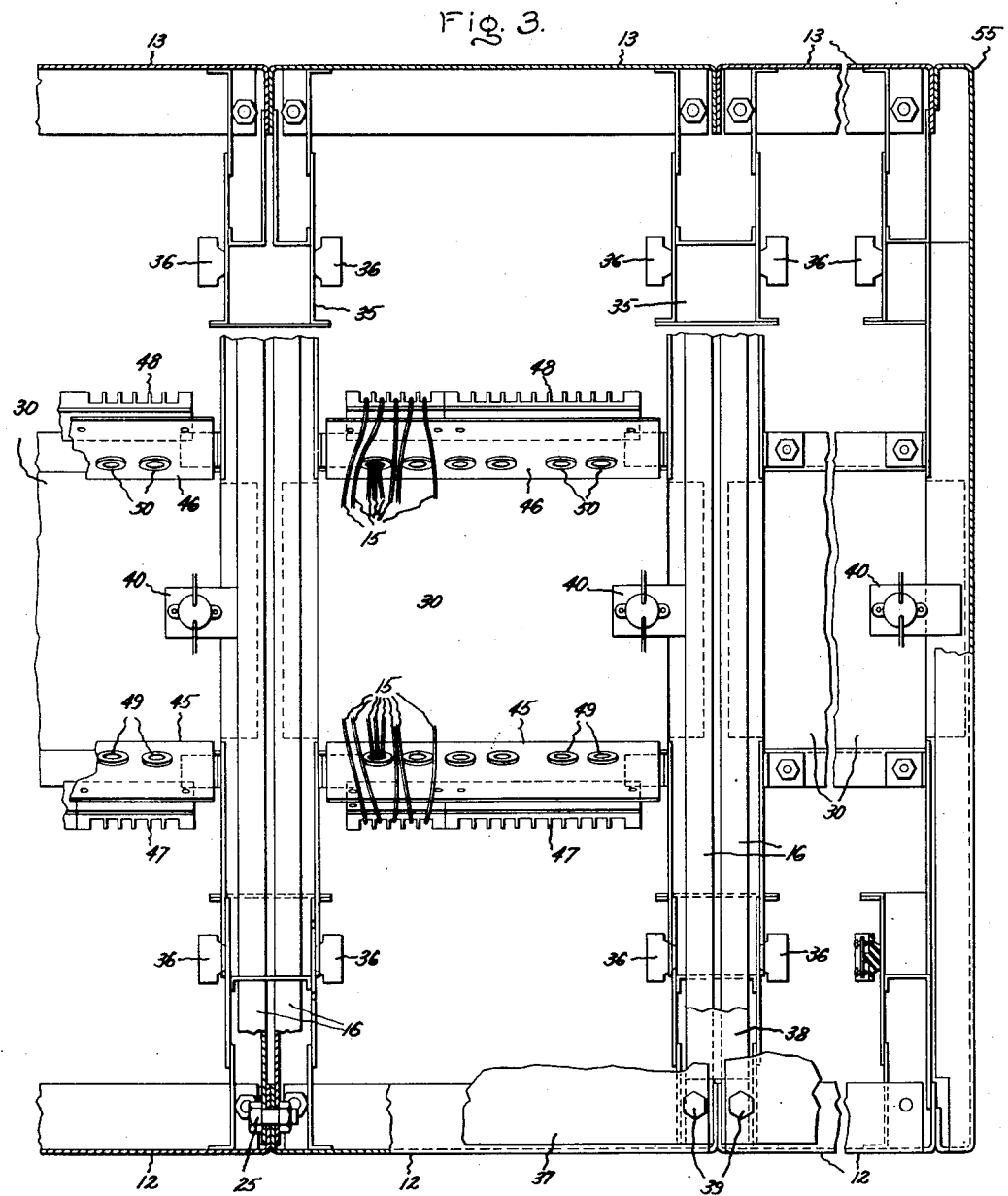

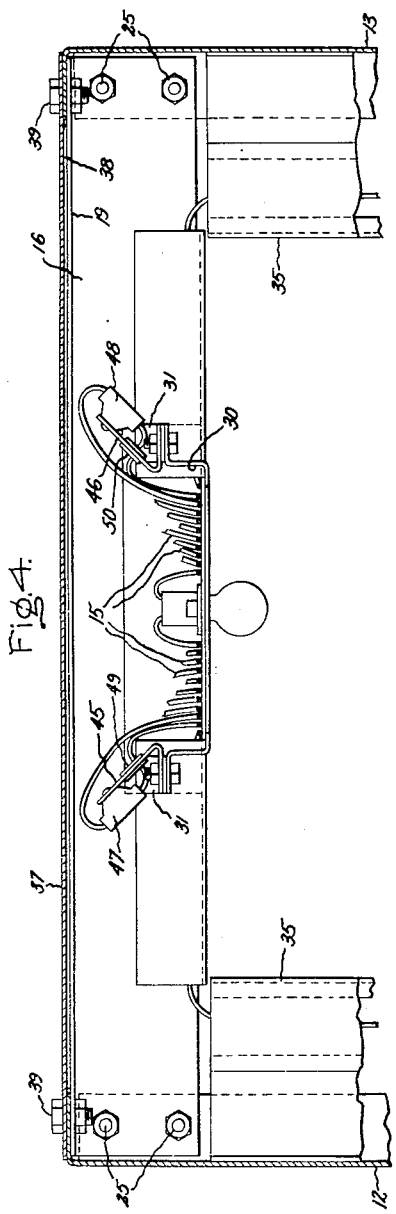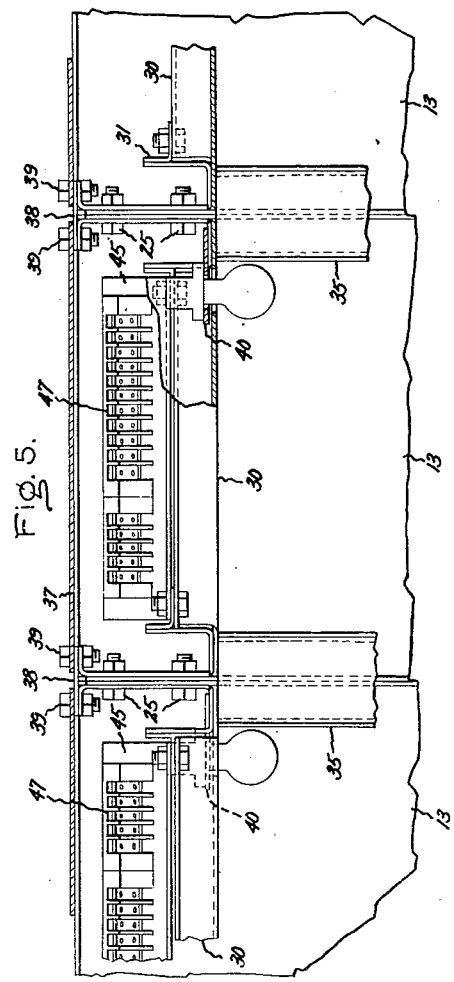

2,567,740

UNITED STATES PATENT OFFICE 2,567,740

CHANNEL BRACING AND INTERSECTING WIRING TROUGH SYSTEM FOR SWITCHBOARDS

Walter L. Smith, Jr., Philadelphia, Pa., assignor to General Electric Company, a corporation of New York Application May 4, 1950, Serial No. 159,925

5 Claims. (Cl. 175—298)

1

The invention relates to switchboards and the principal object is to provide an improved overhead channel bracing structure and intersecting wiring trough system that is particularly suitable for tunnel type duplex switchboards. Such switchboards usually are formed of floor mounted juxtaposed units with each unit having a top extending between the front and rear vertical panels on which a multiplicity of meters, instruments, relays, signal lamps, control devices and accessories may be mounted and electrically interconnected to meet widely varying electrical conditions and specifications.

In accordance with the present invention, the tunnel type duplex switchboard is provided with an inner overhead metal channel lattice that serves both to structurally interconnect the front and rear panels into self-sustaining units and support the top therebetween and to form an intersecting main and a plurality of transverse laterally open wiring troughs spaced below the top so that all the intersecting troughs are laterally accessible from the inside of the switchboard units for housing the many wires that may be required between the front and rear panels of each unit, between either panel of adjacent or remote units and to disconnecting terminal blocks for the necessary shipping splits between interconnected groups of units.

A specific object is to provide an improved specially formed unequal upright leg channel brace having the wider leg capable of supporting the top when required as well as securing the front and rear vertical panels into a self-sustaining switchboard unit and the narrower leg forming a transverse wiring trough for housing the interconnecting wires between the panels in a manner to permit ready access thereto for installation, inspection, testing or repair and provided with central cut-outs in the opposite legs of the channel for forming, in conjunction with a removably mounted intersecting laterally accessible main wiring trough a longitudinal passageway for the necessary interconnecting wires extending between the adjacent or remote switchboard units.

Further objects and advantages of the invention will appear in the following description of the accompanying drawings in which Fig. 1 is a perspective view of a tunnel type duplex switchboard provided with the improved channel bracing and intersecting wiring trough system of the present invention with the tops of the switchboard units removed or broken away in order more clearly to show the details of the interior construction; Fig. 2 is a perspective view on an enlarged scale of the improved specially formed unequal leg cross channel brace and integral laterally open transverse wiring trough provided by the present invention; Fig. 3 is a top view on an enlarged scale of a part of the switchboard shown in Fig. 1 indicating how reversed and spaced apart pairs of unequal leg channel braces of Fig. 2 are applied to hold opposing switchboard panels in self-sustaining alignment; Fig. 4 is a side view on an enlarged scale showing the interrelation of the unequal leg channel brace with the cooperating structural parts of the switchboard; and Fig. 5 is a side view also on an enlarged scale showing the cooperating relation of the main or through wiring trough with the spaced apart transverse wiring troughs formed by the unequal leg channel brace members extending between the front and rear panels forming each switchboard unit.

As shown in Fig. 1, the tunnel type duplex switchboard, indicated generally by the reference character 10, is formed by juxtaposed units 10a, 10b, and 10c and the partially shown unit 10d that are floor mounted in alignment on the base channels 11. Each unit consists of a front panel 12 and a rear panel 13 upon which various electrical elements, indicated generally by the reference character 14, are mounted. For example various meters, instruments, relays, signal lamps, control devices and accessories may be mounted on either the inside or outside of each panel and electrically interconnected to meet widely varying switchboard conditions and specifications. Consequently, the running of the interconnecting wires 15 for the switchboard may become rather complicated and involved unless provision is made for conveniently and neatly housing all the interconnecting wires emanating from the various electrical elements 14 on the switchboard.

In accordance with the present invention, each switchboard unit is provided with a reversed pair of the specially formed unequal upright leg overhead bracing channels 16 for structurally interconnecting the front and rear panels 12 and 13 in self-sustaining alignment and each bracing channel 16 has an integral open ended and laterally open wiring trough 16a extending along the bottom of the channel for housing the various wires that may extend between the panels of each unit or between either panel and adjacent or remote units. As more clearly indicated in Fig. 2, each unequal leg channel 16 may be readily formed by suitable bending from properly punched sheet material to provide the wider leg 18 with the right angularly bent-over reenforcing ledge 19 and a narrower leg 20 that is both shorter and narrower than the wider leg 18. The registering or aligned through wiring cut-outs 17 are centrally located in the opposite legs of the unequal leg channel 16 to be contiguous with the bottom 21 of the channel 16 so as to facilitate the running of the wires from the integral laterally open transverse wiring trough 16a formed by the shorter leg 20 and the bottom 21 of the channel. Each channel brace 16 is provided with suitable means such as the spaced-apart bolt holes 22 and 23 at the opposite ends of the wider leg that extend beyond the shorter leg thereof for overlapping attachment to the upper inturned vertical edges of both the front and back panels 12 and 13 of each switchboard unit with the open ends of the wiring trough 16a located conveniently adjacent the backs of the panels 12 and 13 for ready reception of all the wiring extending therefrom. Thus, when the units are juxtaposed as shown in Fig. 1, all or any desired group of units may be rigidly interconnected by utilizing common pairs of holding bolts 25 for attaching the extended ends of the wider vertical leg of the reversed adjacent channel braces 16 to overlap the inturned vertical edges of the respective front and back panels of the adjacent switchboard units as shown more clearly in Fig. 3.

In order to house the through wires extending between the reversed spaced-apart pairs of channel braces 16 of each unit, a main intersecting wiring trough 30 is arranged to be removably bolted at each end to a pair of suitable angle brackets 31, preferably welded to the shorter legs 20 of the reversed braces 16 on either side of the wiring cut-outs 17 with the relative spacings such that the bottom of the main trough 30 is mounted in alignment with the bottom 21 of each intersecting channel brace 16 as more clearly shown in Figs. 4 and 5. The running of the wires from the various electrical elements 14 mounted on the front and rear panels of each unit, as well as of external conductors, may be further facilitated by suitable wiring stacks 35 that may extend from the floor adjacent the integral wiring trough of each overhead brace 16 at each junction between the adjacent front or rear panels. Such stacks 35 are ordinarily suitably perforated throughout so as to enable any wire to be conveniently brought out at a point adjacent the electrical device or terminal blocks 36 to which the wire is to be connected. Consequently, a convenient and safe path is always available through the stacks 35 and the intersecting wiring troughs 16a and 30 for running a wire from any terminal of any device or terminal block to any other device or terminal block mounted on any panel of any unit in the switchboard with the wire effectively housed within a metal inclosure and yet readily accessible. Moreover, all wires passing upwardly in any stack can be conveniently laid in the integral laterally accessible transverse wiring trough 16a formed by the narrow leg 20 of each of the brace members 16 that is located adjacent the stack. Then, due to the intersecting wiring trough lattice formed by the multiplicity of channel braces 16 and the main intersecting troughs 30, any wire can be extended in either direction longitudinally of the switchboard and then carried transversely through one of the transverse wiring troughs 16a to any other wiring stack for connection to an adjacent device or terminal block mounted on either the front or rear panel of any switchboard unit.

Each switchboard unit may be provided with a dust sealing top 37 resting upon a filler piece 38 laid over the oppositely turned ledges 19 of the two adjacent bracing members 15 so as to form a substantially dust tight joint when the top 37 is fastened down by the bolts 39. Due to the fact that the main longitudinal wiring trough 30 as well as all the intersecting lateral wiring troughs 16a formed by the narrow leg and bottom of the brace 16 are spaced well below the sealing tops 37 of the units, all wires carried in these troughs are laterally accessible from the inside of the switchboard without requiring the removal of any top.

In order to provide illumination for the interior of the tunnel type duplex switchboard, suitable lamp mounting brackets 40 may be secured to the bottom 21 of one of the pair of cross brace members 16 in each switchboard unit so as to enable the mounting of a lamp therein as illustrated in Figs. 4 and 5.

When a completely wired tunnel type duplex switchboard 10 is to be shipped, shipping splits usually are provided between adjacent groups of integrally interconnected units, each of a size and weight that can be conveniently handled. To take care of the through wires at such a split, which may be assumed to be between units 10b and 10c as shown in Fig. 1, the main intersecting wiring troughs 30 in these units, as shown in Figs. 1, 3, 4 and 5, may be provided with oblique angle extensions 45 and 46 carrying readily accessible external terminal blocks 47 and 48 and provided with a row of grommet insulated perforations 49 and 50 so as to facilitate the breaking of all of the through wires at the split. Thus the through wire ends, properly tagged to correspond with the proper terminals, can be readily withdrawn from either one of units 10b or 10c into the main wiring trough 30 of the other unit for shipping, and reconnection can be conveniently and accurately made upon reassembly of the switchboard.

In case the completely assembled and installed tunnel type switchboard is to be pressurized in order more effectively to exclude dust, suitable sealing end panels 55 may be provided as indicated in Fig. 3. However, when such precautions are unnecessary, the tops 37 and even some of the rear panels 13 of the complete switchboard may be omitted when not required. In such a case, the rear ends of the cross bracing channels 16 may be provided with suitable structural supporting posts.

What I claim as new and desire to secure by Letters Patent of the United States is:

1. A switchboard panel brace comprising an unequal upright leg channel having the wider leg extending endwise beyond the narrower leg at one end for attachment to the switchboard panel so that the narrower leg forms an open-ended and laterally open wiring trough along the bottom of the channel and provided with through wiring cut-outs aligned centrally in the opposite legs of the channel.

2. A switchboard panel brace comprising an unequal upright leg channel having the wider leg extended endwise beyond the narrow leg at one end for transverse bracing interconnection with the back of the switchboard panel and the shorter and narrower leg forming a laterally open transverse wiring trough extending along the bottom of the channel with an open end adjacent the back of the panel and provided with aligned through wiring cut-outs in the opposite legs of the channel contiguous with the bottom of the channel.

3. A switchboard panel bracing and intersecting wiring trough structure having in combination a reversed pair of unequal upright leg channels spaced apart in parallel opposing relation and each having the wider vertical leg extended endwise at each end for bracing interconnection with the back of the panel and a narrow vertical leg forming a laterally open transverse wiring trough extending along the bottom of the channel and having an open end adjacent the back of the panel and provided with through wiring cut-outs aligned centrally in the opposite legs of the channel, and an intersecting through wiring trough extending between the spaced apart bracing channels in alignment with the cut-outs therein.

4. A duplex switchboard unit having in combination front and rear panels having inturned vertical edges, a pair of reversed unequal upright leg channels each having the ends of the wider leg extended and provided with means for overlapping attachment to the inturned vertical edges of the front and rear panels to hold the panels in opposing alignment and the shorter and narrower leg forming a laterally open transverse wiring trough extending along the bottom of the channel and having an open end adjacent the backs of the panels and provided with registering cut-outs aligned centrally in the opposite legs of the channel contiguous with the bottom of the channel, and a through wiring trough removably mounted on each channel in alignment with the cut-outs therein.

5. A tunnel type duplex switchboard unit having in combination front and rear panels having inturned vertical edges, a top extending between the top edges of the panels, a pair of reversed opposing unequal upright leg channels, each having the ends of the vertical wider leg extending beyond the narrower leg and secured respectively to the front and rear panels for holding the panels in opposing alignment and having the upper edge thereof bent over to form a ledge for supporting the top therebetween and having the shorter and narrower leg forming a laterally accessible transverse wiring trough extending along the bottom of the channel and having an open end adjacent the backs of the panels and provided with aligned central cut-outs in the opposite legs of the channel, and an intersecting through wiring trough extending between the channels and mounted on each channel in alignment with the cut-outs therein.

WALTER L. SMITH, Jr.

REFERENCES CITED

The following references are of record in the file of this patent:

UNITED STATES PATENTS

| Number | Name | Date |
| --- | --- | --- |
| Re. 20,224 | Van Billiard | Dec. 15, 1936 |
| 2,006,150 | Reed et al. | June 25, 1935 |
| 2,051,639 | Kalmbacker | Aug. 18, 1936 |
| 2,140,376 | Anderson | Dec. 13, 1938 |
| 2,363,327 | Hodgkins | Nov. 21, 1944 |
| 2,467,828 | Hodgkins | Apr. 19, 1949 |